United States Patent
Hulugundi et al.

(10) Patent No.: US 11,281,418 B1
(45) Date of Patent: Mar. 22, 2022

(54) ELECTRONIC DEVICE SMART COVER WITH DISPLAY CAPABILITY

(71) Applicant: International Business Machines Corporation, Armonk, NY (US)

(72) Inventors: Jagadesh Ramaswamy Hulugundi, Bangalore (IN); Sarbajit K. Rakshit, Kolkata (IN); Raghuveer Prasad Nagar, Kota (IN); Reji Jose, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/020,911

(22) Filed: Sep. 15, 2020

(51) Int. Cl.
*G06F 3/14* (2006.01)

(52) U.S. Cl.
CPC ................... *G06F 3/1407* (2013.01)

(58) Field of Classification Search
CPC .................................................. G06F 3/1407
See application file for complete search history.

(56) References Cited

U.S. PATENT DOCUMENTS

| | | | |
|---|---|---|---|
| 9,559,743 B2 | 1/2017 | Del Toro et al. | |
| 10,084,501 B1 | 9/2018 | Coverstone | |
| 10,488,883 B2 | 11/2019 | Rothkopf | |
| 2006/0266563 A1* | 11/2006 | Kaplan | G01G 19/58 177/245 |
| 2013/0076614 A1* | 3/2013 | Ive | H04M 1/0245 345/156 |
| 2014/0159867 A1* | 6/2014 | Sartee | G08B 5/36 340/6.1 |
| 2016/0162256 A1* | 6/2016 | Komaromi | A61B 5/681 700/94 |
| 2016/0259377 A1 | 9/2016 | Hoellwarth et al. | |

OTHER PUBLICATIONS

"Method and System for Evaluating Confidentiality of Content to be Displayed on Different Areas of Transparent Flexible Display Devices", ip.com, An IP.com Prior Art Database Technical Disclosure, IP.com No. IPCOM000239673D, IP.com Electronic Publication Date: Nov. 24, 2014, 6 pages.
Funnyman, "E-Textiles", steemit, printed Jun. 23, 2020, 3 pages. https://steemit.com/technology/@funnyman/e-textiles.
Smith, "Where next for e-textiles and smart garments?" Just-Style, Oct. 6, 2015, 7 pages. https://www.just-style.com/analysis/where-next-for-e-textiles-and-smart-garments_id126267.aspx.
"Smart Textiles", Pinterest, Website, printed Jun. 23, 2020, 1 page. https://in.pinterest.com/pin/437130707564667081/?Ip=true.
Afroj et al., "Highly Conductive, Scalable, and Machine Washable Graphene-Based E-Textiles for Multifunctional Wearable Electronic Applications", Adv. Funct. Mater. 2020, DOI: 10.1002/adfm.202000293, 10 pages.
Rogerson, "Foldable phones: all the rumored and confirmed foldable handsets", Techradar, Feb. 14, 2020, 26 pages. https://www.techradar.com/in/news/foldable-phones.

\* cited by examiner

*Primary Examiner* — Sahlu Okebato
(74) *Attorney, Agent, or Firm* — Jeffrey M. Ingalls

(57) ABSTRACT

A smart cover for an electronic device is provided. An electronic device includes a main display device, and a cover operatively coupled to the main display device. The cover incudes an inner surface and an outer surface, the inner surface and the outer surface of the cover include an electronic cloth-based material. The electronic cloth-based material is configured to display content on the inner and outer surfaces of the cover.

14 Claims, 6 Drawing Sheets

ELECTRONIC DEVICE SMART COVER WITH DISPLAY CAPABILITY

BACKGROUND

The present disclosure relates to electronic display devices, and to smart covers used in conjunction with the display devices. The smart cover may include an e-textile, or electronic cloth capable of displaying content to a user.

SUMMARY

Embodiments of the present disclosure relate to a smart cover for an electronic device. The electronic device includes a main display device, and a cover operatively coupled to the main display device. The cover incudes an inner surface and an outer surface, the inner surface and the outer surface of the cover include an electronic cloth-based material. The electronic cloth-based material is configured to display content on the inner and outer surfaces of the cover.

Other embodiments of the present disclosure relate to a method of displaying content. The method includes determining a folding state of a cover of an electronic device, the cover including an electronic cloth-based material on an inner surface of the cover and an outer surface of the cover. The method also includes determining a viewability of different portions of the inner surface of the cover in a viewing direction of the cover and of different portions of the outer surface of the cover in the viewing direction. The method also includes determining a viewability of different portions of the inner surface of the cover in an opposed viewing direction that is opposed to the viewing direction and of different portions of the outer surface of the cover in the opposed viewing direction. The method also includes enabling display of the different portions of the inner surface and the outer surface based on the viewability determinations.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, explain the principles of the disclosure. The drawings are only illustrative of certain embodiments and do not limit the disclosure.

Figure 1:
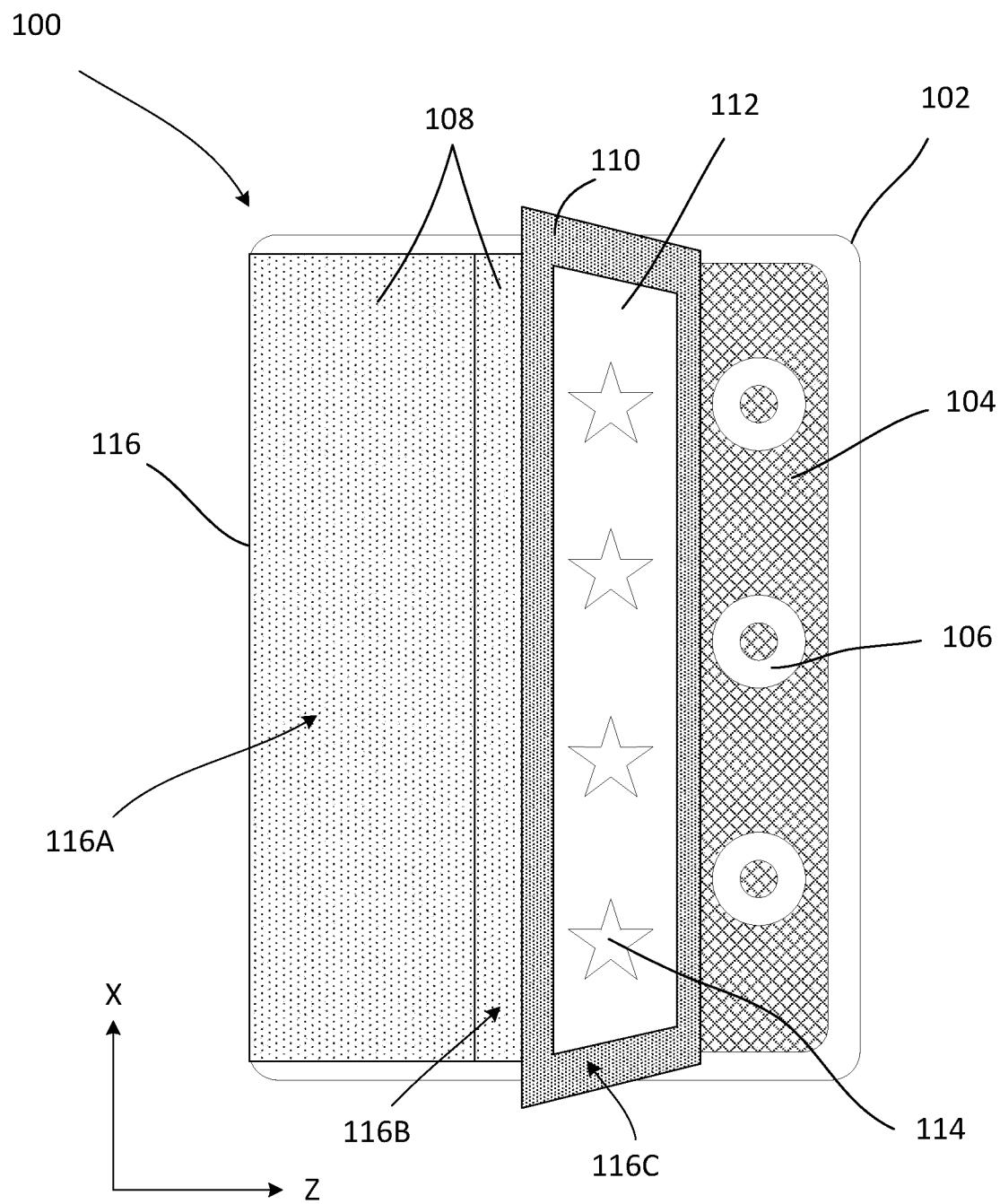
FIG. 1 is a top-down view of an electronic device including a smart cover, according to embodiments.

It should be appreciated that elements in the figures are illustrated for simplicity and clarity. Well-understood elements that may be useful or necessary in a commercially feasible embodiment may not be shown for the sake of simplicity and to aid in the understanding of the illustrated embodiments.

DETAILED DESCRIPTION

The present disclosure describes a smart cover for an electronic device. The smart cover has a display capability. In certain embodiments, the smart cover is foldable and includes a plurality of different segments than can fold (or bend) relative to each other. In certain embodiments, one or more of the different segments has a display capability on at least one of the inner and outer surfaces of the smart cover.

In certain embodiments, the inner surface of the smart cover is made of a soft cloth-based material, so that it can provide proper support and covering of the display surface, and also can be used as a supporting stand. In certain embodiments, the inner surface of the smart cover may have a display capability. In these embodiments, while a user is partially folding the smart cover, the user can get additional display surface in the partially folded smart cover along (i.e., in addition to the display surface of the main electronic device to which the smart cover is attached).

In certain embodiments, a system and method are provided where an inner surface of the smart cover is made of an electronic smart cloth-based material. When folding the smart cover, the inner surface of the smart cover can also show additional digital content along with the actual display surface. Use of e-textile (or smart cloth, or fabric having an electronic display functionality) may protect the display surface from rubbing action, and at the same time, can be used for displaying contents In certain embodiments, both the inner or outer surfaces of the smart cover may be made of the e-textile or electronic cloth-based material, and the smart cover is capable of showing additional contextual content on both sides of the smart cover.

In certain embodiments, when a user partially folds the smart cover, and the folding of the smart cover is towards the display surface, then the inner visible surface of the smart cover will be showing additional digital content which is related to the content displayed in the visible area of the display device of the main electronic device.

In certain embodiments, if the folded area of the smart cover is opposite to the user (i.e., from a different viewing angle that the user cannot see) or opposite to the display surface of the main electronic device, then one or more portions of the smart cover may display additional content to other users who are sitting on an opposite side of the display device or user.

In certain embodiments, a user may visualize the folding pattern of the smart cover, and the user may selectively identify one or more areas on the folded smart cover where the user wants to display additional content.

In certain embodiments, when the smart cover is opened partially, and the dimension of the displayed content is larger (i.e., larger than simply the area of the display of the main electronic device), then the system may consider both the exposed folded area of the smart cover and the actual display area as an aggregated display area, and may show the entire aggregated display area to the user.

In certain embodiments, the upper surface of the smart cover may have an e-textile or electronic cloth material. In these embodiments, summary information of any content may be displayed in the upper surface of the smart cover. In these embodiments, if the user wants to have a detailed view of the content, then user may fold the smart cover. Thus, in certain embodiments, the system may use both the folded portion of smart cover and the display area of the electronic device to show the detailed visual content.

In certain embodiments, based on the confidentiality of the content in consideration, the upper surface of the smart cover may show summarized information, notifications etc., and upon folding the smart cover may show the complete contents of the information.

Various embodiments of the present disclosure are described herein with reference to the related drawings. Alternative embodiments can be devised without departing from the scope of the present disclosure. It is noted that various connections and positional relationships (e.g., over, below, adjacent, etc.) are set forth between elements in the following description and in the drawings. These connections and/or positional relationships, unless specified otherwise, can be direct or indirect, and the present disclosure is not intended to be limiting in this respect. Accordingly, a coupling of entities can refer to either a direct or an indirect coupling, and a positional relationship between entities can be a direct or indirect positional relationship.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

For purposes of the description hereinafter, the terms "upper," "lower," "right," "left," "vertical," "horizontal," "top," "bottom," and derivatives thereof shall relate to the described structures and methods, as oriented in the drawing figures. The terms "overlying," "atop," "on top," "positioned on" or "positioned atop" mean that a first element, such as a first structure, is present on a second element, such as a second structure, wherein intervening elements such as an interface structure can be present between the first element and the second element. The term "direct contact" means that a first element, such as a first structure, and a second element, such as a second structure, are connected without any intermediary conducting, insulating or semiconductor layers at the interface of the two elements.

Referring now to the drawings, and initially to FIG. 1, this figure is a top down view of a device 100 that incorporates a smart cover. According to certain embodiments, the device 100 includes a main electronic device 102 and a cover 116 operatively coupled to the main electronic device 102. The main electronic device 102 may be a smart phone, a tablet computer, or any other suitable electronic device that includes some display functionality. As shown in FIG. 1, the main electronic device 102 includes a main display 104 device. The main display 104 may be based on any suitable display technology (e.g., liquid crystal display (LCD), a light-emitting diode (LED) display, and organic LED (OLED) display, etc.). In certain embodiments, the cover 116 is a smart cover having a plurality of different segments. The cover 116 may include a plurality of different segments (or portions), where one or more of the segments have a display capability. In certain embodiments, one or both of the inner surface 112 and outer surface 108 of the smart cover 116 is made of an electronic smart cloth-based material that has a display capability.

In general, a smart cloth (or e-textile) refers to a class of fabrics that enable digital components and electronics to be embedded therein. In certain examples, e-textiles may also be referred to as smart clothing, smart garments, electronic textile and smart fabrics. According to certain implementations, smart cloths may be used for communication, they may transform their shape, they may conduct energy, or they may be used as a display device. In the present embodiments, such a smart cloth is implemented as one or more display devices that form a cover for an electronic device such as a tablet computer.

Referring again to FIG. 1, the main electronic device 102 includes a display device having a main display area 104. Any sort of primary display content 106 may be displayed on the main display area 104. Display content 106 may include images, words, symbols, or any combination thereof. In certain embodiments, the cover 116 includes a plurality of different foldable segments 116A, 116B, and 116C (or sections) that are independently foldable relative to each other and relative to the main electronic device 102. In the example shown in FIG. 1, the cover 116 includes the three separate foldable segments 116A, 116B, and 116C, each segment including a smart cloth (or e-textile) capable of displaying certain content. These segments 116A, 116B, and 116C may fold along a hinge or a seam in certain examples, and they may be roughly the same size. In the example shown in FIG. 1, the three segments 116A, 116B, and 116C can fold together to form a triangular prism shape, and they may provide support for positioning the main electronic device 102 at a certain angle. In other examples, four or more foldable segments may be used. For example, when the cover 116 is not in a folded state and is lying flat against the surface of the main electronic device 102, the entire main display area 104 of the main electronic device 102 is covered by the cover 116. In this unfolded state, in certain embodiments, summary display content may be viewed on an outer surface 108 of one or more of the foldable segments 116A, 116B and 116C of the cover 116. This summary display content may be viewed on any or all of the plurality of segments of the cover 116.

As shown in top-down view of the example of FIG. 1, a first one of the segments 116C has been folded to reveal a portion of the main display area 104. In addition, in this folded state, the outer surface 108 of the foldable segment 116C is hidden from the viewer's perspective. In addition, an inner surface 110 of one of the foldable segments includes a smart cloth that has a cover display area 112. In this example, a viewing angle of the viewer of the main electronic device 102 originates from the positive Z direction (i.e., from the right side in FIG. 1). From this viewing angle, the user can view not only the revealed portion of the main display area 104, but also display indicia 114 appearing in the display area 112 of the revealed segment 116C of the smart cover 116. In this example, the inner surface 110 of the folded segment has the cover display area 112 activated because it is been determined that the viewer is able to view that portion of the inner surface 110 from the particular viewing angle (i.e., from the positive Z direction).

In certain embodiments, when the smart cover 116 is opened partially, and the dimension of the displayed content is larger (i.e., larger than simply the area of the main display area 104 of the electronic device 100), then the system may consider both the exposed folded area of the smart cover 116 and the actual display area as an aggregated display area, and may show the entire aggregated display area to the user.

In this example, the revealed portion of the main display area 104 as well as the display area 112 of the folded segment 116C may be aggregated together. Thus, a larger cumulative area may be used to display content. As additional sections of the cover 116 are folded away from the main display 104, additional inner surfaces of folded segments 116B and 116A may appear in the viewing direction of the user, and the display areas thereof (not shown in FIG. 1) may also be activated and considered with regard to determining an aggregated display area.

Figure 2A:
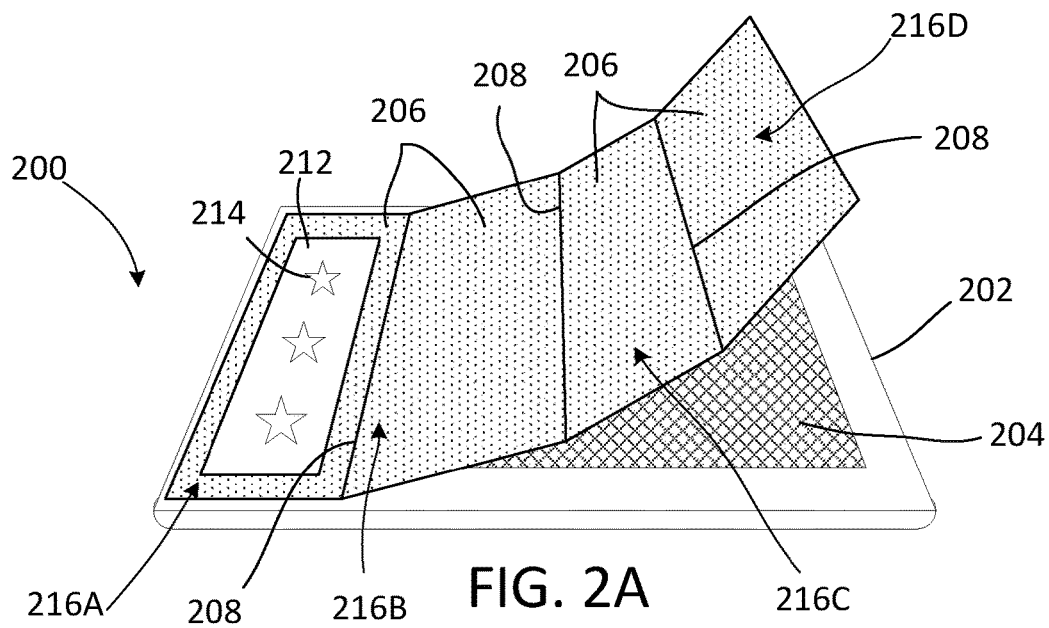
FIGS. 2A, 2B, and 2C are different perspective views of an electronic device including a smart cover, according to embodiments.
Figure 2B:
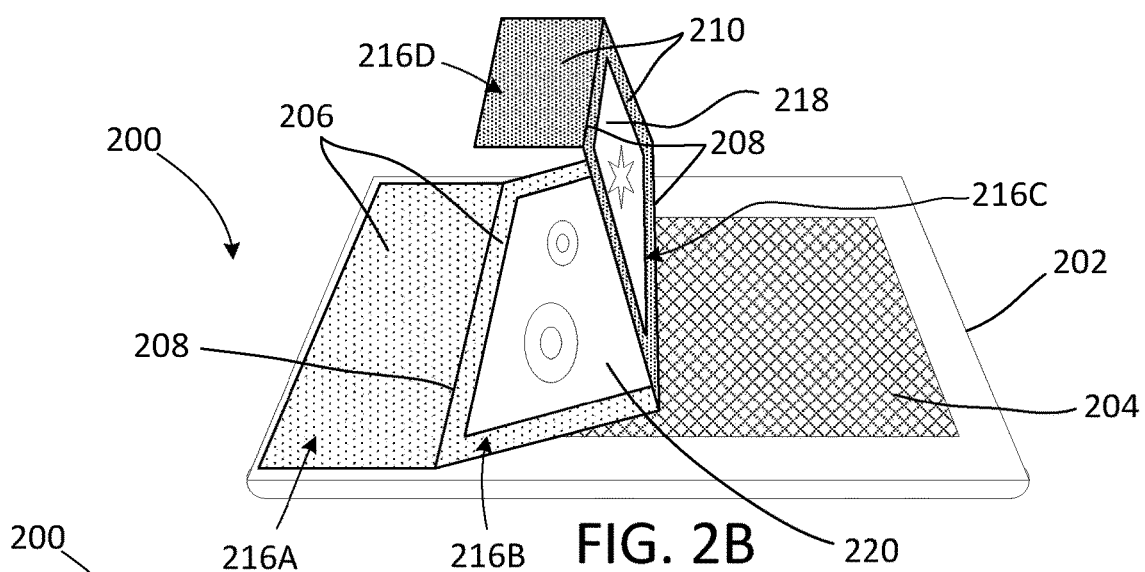
Figure 2C:
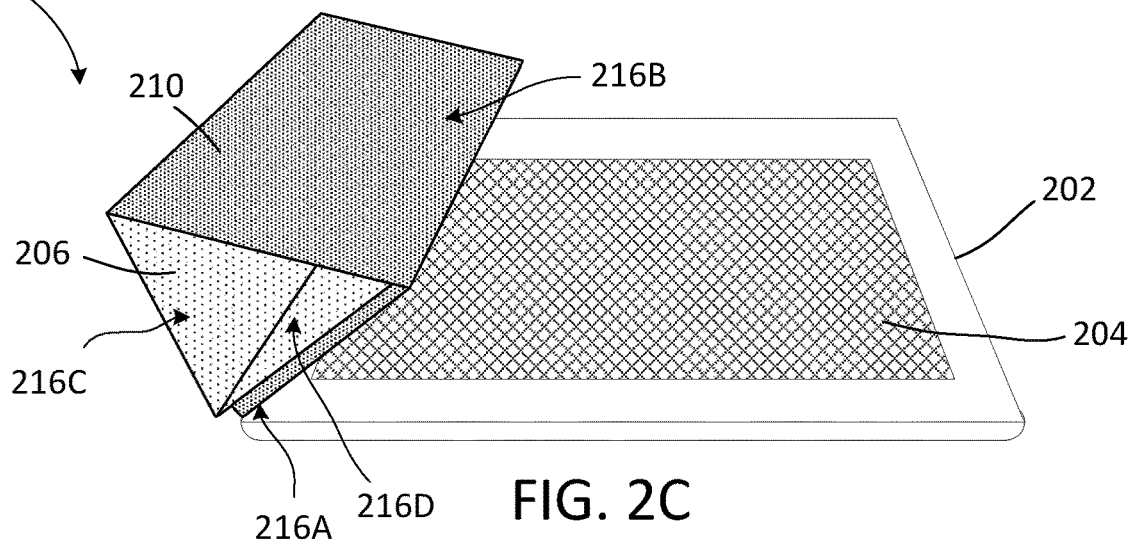

Referring now to FIGS. 2A-2C, different perspective views of the main electronic device 200 are shown with the cover segments 216A-216D in various folding configurations of the cover 216. In this example, there are four cover segments 216A-216D (contrary to the three segments 116A, 116B and 116C shown in FIG. 1). In FIG. 2A, the device 200 includes an electronic device 202 having a display device with a main display area 204. In certain embodiments, the cover 216 includes the different foldable segments 216A, 216B, 216C, and 216D (or sections) that are independently foldable relative to each other and relative to the main electronic device 202. In the example shown in FIGS. 2A-2C, the cover 216 includes four separate foldable segments 216A, 216B, 216C, and 216D, each including a smart cloth (or e-textile) capable of displaying certain content. These segments 216A, 216B, 216C, and 216D may fold along a hinge or a seam 208 between adjacent segments in certain examples, and they may be roughly the same size.

In the embodiment shown in FIG. 2A, the smart cover 216 is in a partial state of folding, where each of segments 216B, 216C and 216D have been partially folded away from the main display area 204 of the electronic device 202. Also, in FIG. 2A, segment 216A of the cover has not been folded away from the main display area 204 of the electronic device 202. In this example, it has been determined to activate the display area 212 on the outside surface 206 of segment 216A. As shown in FIG. 2A, any suitable indicia may be displayed in the display area 212. It should be appreciated that this is merely one example of activating a particular display area of the cover 216, and one or more other segments 216B, 216C and 216D may also (or alternatively) activated. In certain embodiments, the angle of the segment relative to the planar surface of the display device (i.e., main display area 204) may be a factor in determining whether a particular segment is activated or not. For example, a viewing angle of an opposed viewer (i.e., a person opposed to the person viewing the main display area 204 of the electronic device 202) may be taken into consideration when determining which segments to activate.

Referring now to FIG. 2B, a smart cover 216 is in a more complete state of folding, where each of segments 216B, 216C and 216D have been further folded away from the main display area 204 of the electronic device 202. In this example, segment 216B has been folded to a sufficient degree such that the viewer of the main display area 204 is also able to view the display area 218 of segment 216C. Because the system has determined that segment 216C has been folded to a sufficient degree to enable the viewer of the main display area 204 view the display area 218, this display area 218 is activated. In this example, it is the inner surface 210 of segments 216C that has the smart cloth activated. Also, because the system has determined that segment 216B has been folded to a sufficient degree to enable the opposed viewer to view the display area 220, this display area 220 is activated also. In this example, it is the outer surface 206 of segment 216B that has the smart cloth activated. Thus, it should be appreciated that different segments of both the inner surface 210 of the smart cloth and different segments of the outer surface 206 of the smart cloth can be activated simultaneously based on the ability of one or both of the viewer and the opposed viewer to actually see the respective display areas.

Referring now to FIG. 2C, the smart cover 216 is in a complete state of folding (i.e., in the general shape of triangular prism), where each of segments 216A, 216B, 216C and 216D have been further folded away from the main display area 204 of the electronic device 202. In this example, segment 216D has been folded back and is resting against the surface of segment 216A. Also, in this example, no portion of the inner surface 206 of any segment of the cover 216 is viewable by either main viewer or the opposed viewer. Consequently, none of the display areas on the inner surface 206 of the cover 216 are activated. Although not shown in FIG. 2C, one or more of the outer surfaces 210 of segments 216A, 216B and 216C may be activated depending on the calculated positions (or viewing angles) of the viewer and the opposed viewer. In certain embodiments, one or more image capturing devices may be included on the main electronic device 202 and/or the cover 216 to determine the positions of the different viewers relative to the positions of the segments 216A, 216B, 216C and 216D.

Figure 3A:
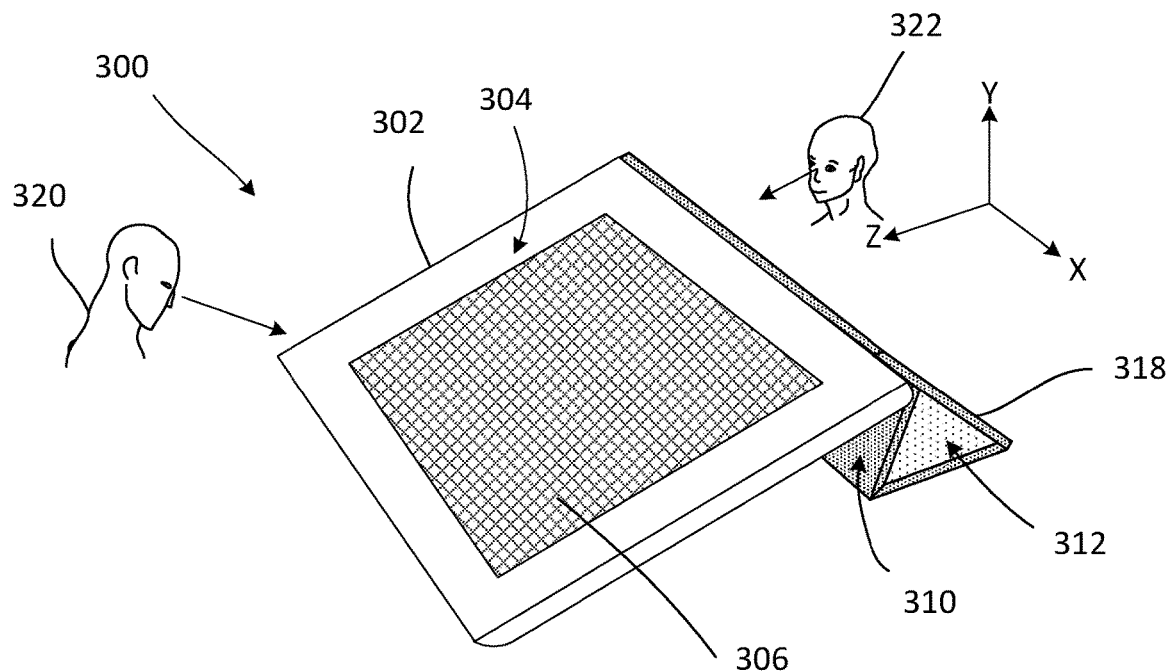
FIGS. 3A and 3B are different perspective views of an electronic device including a smart cover, according to embodiments.
Figure 3B:
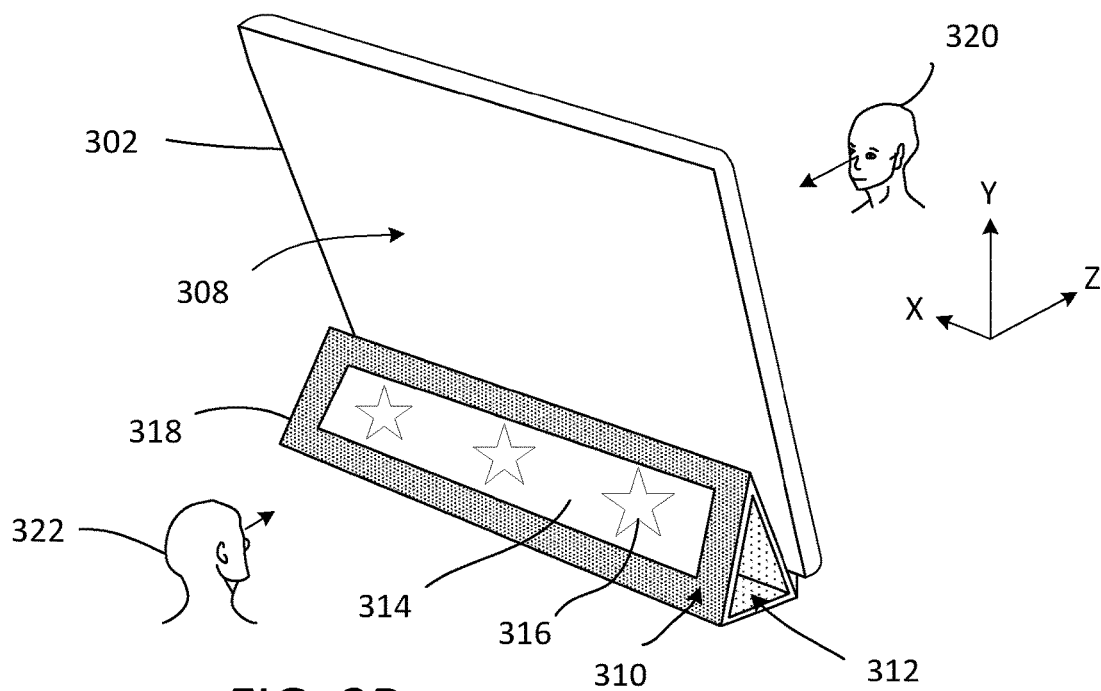

Referring now to FIGS. 3A and 3B, additional perspective views of the main electronic device 300 are shown, where the completely folded cover 318 provides different methods of supporting the electronic device 302 at different angles or positions. As shown in FIG. 3A, the smart cover 318 includes an inner surface 310 and an outer surface 312. The electronic device 302 includes a display device 304 having a display area 306. As shown in FIG. 3A, the completely folded cover 318 forms a roughly triangular prism shape that allows the main electronic device 302 to be propped up at a slight angle relative to the X-Z plane. In this embodiment, the viewer 320 has a viewing angle (i.e., having a viewing angle extending in the general Z-axis direction and slightly down in the Y-axis direction) sufficient to view the display area 306 on the main electronic device 302. Also, an opposed viewer 322 is able to view the backside of the folded cover 318 (i.e., having a viewing angle extending in the general Z-axis direction). Thus, in this example one of the segments of the smart cover 318 may be activated and visible to the opposed viewer 322. FIG. 3B shows an example where such a segment has a display area 314 showing indicia 316, and is visible to the opposed viewer 322, but is not visible to the viewer 320. Also, in the example shown in FIG. 3B, the completely folded smart cover 318 supports the main electronic device 302 at a much steeper angle. It should be appreciated that the embodiments described herein are not limited to the example configurations shown in FIGS. 2A-2C and 3A-3B. There may be any number suitable of segments of the cover, and the cover may be configured in any suitable angular orientation or shape. However, in certain of the embodiments described herein a common feature is that the smart cover has the ability to display content on one or more display areas of cover segments such that either the viewer 320 or the opposed viewer 322 can view the segments in addition to the content on the main display device 308.

Figure 4:
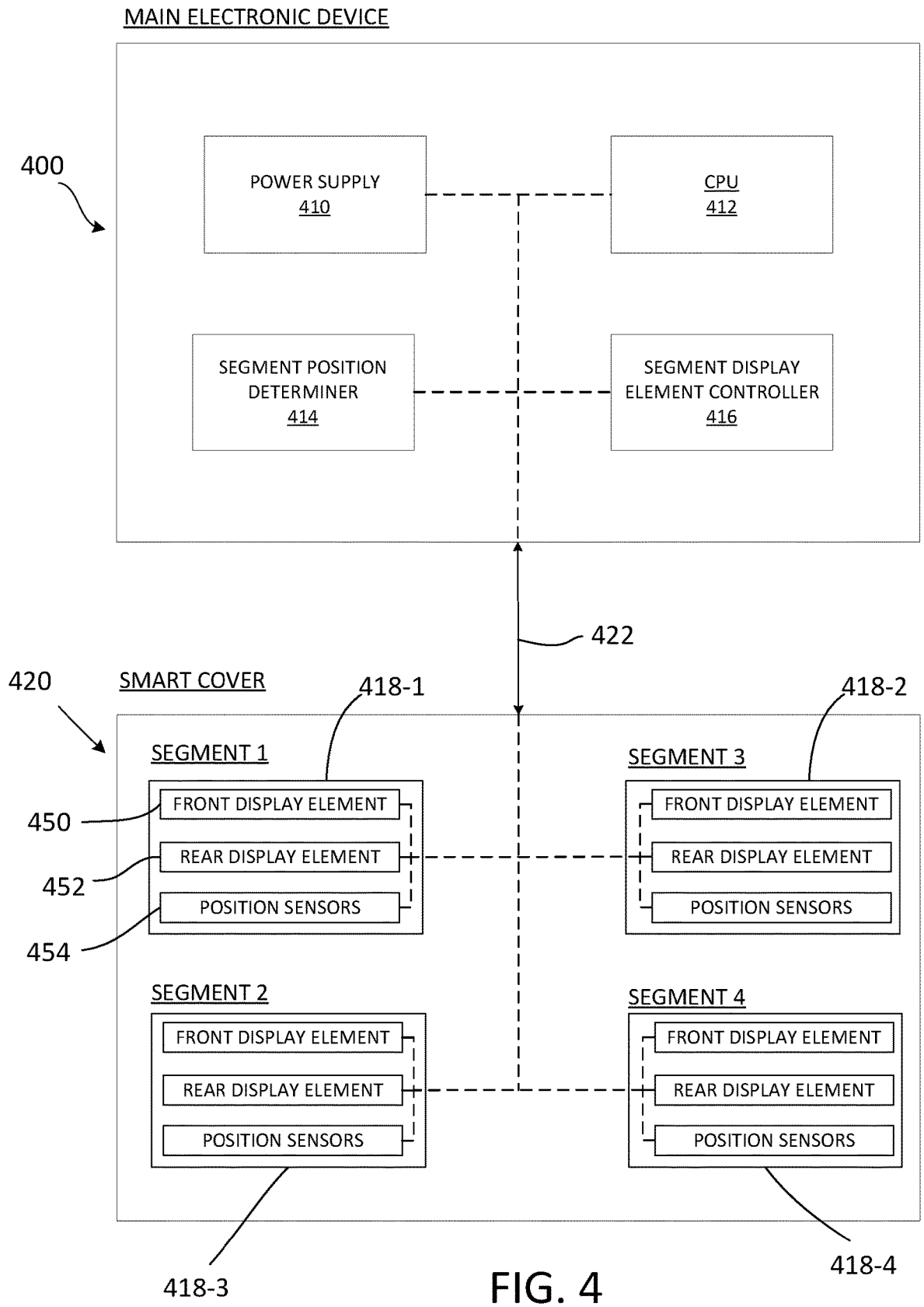
FIG. 4 is a schematic view of certain of the components of an electronic device including a smart cover, according to embodiments.

Referring now to FIG. 4, a schematic representation of the main electronic device 400 and the smart cover 420 is shown. As shown in FIG. 4, the main electronic device 400 may include a power supply 410, a segment position determiner 414, a central processing unit or CPU 412, and a segment display element controller 416, according to embodiments. The main electronic device 400 is operatively coupled to the smart cover 420 via a communications line 422 (e.g., a system bus or some other communication mechanism that allows for transfer of power and information). In certain embodiments, as shown in FIG. 4, the power supply 410 of the main electronic device 400 supplies power not only to a display device of the main electronic device 400, but also to be display elements of smart cover 420. The smart cover 420 includes a plurality of cover segments 418-1, 418-2, 418-3 and 418-4. Each of these segments includes a front display element 450 (configured to display indicia on an outer surface of the smart cover 420) and a rear display element 452 (configured to display indicia on an inner surface of the smart cover 420). In certain embodiments, each of the cover segments 418-1, 418-2, 418-3 and 418-4 includes one or more position sensors 454. As discussed above, the position sensors 454 enable a determination of a position and/or angular orientation of the individual segments 418-1, 418-2, 418-3 and 418-4. Alternatively, sensors can be located in a different location or in different numbers provided that information regarding the position and/or angular orientation of the segments may be determined. In certain embodiments, information from the position sensors 454 are transferred through the communications line 422 to the main electronic device 400. Then, the segment position determiner 414 uses the information from the position sensors 454 to determine the positions of the different segments. Once the positions of the different segments been determined by the segment position determiner 414, the segment display element controller 416 causes each of the cover segments 418-1, 418-2, 418-3 and 418-4 to turn off or on depending upon the determined view ability angles of the main viewer and/or the opposed viewer. The main electronic device 400 may be the exemplary processing system discussed below with respect to FIG. 5.

Figure 5:
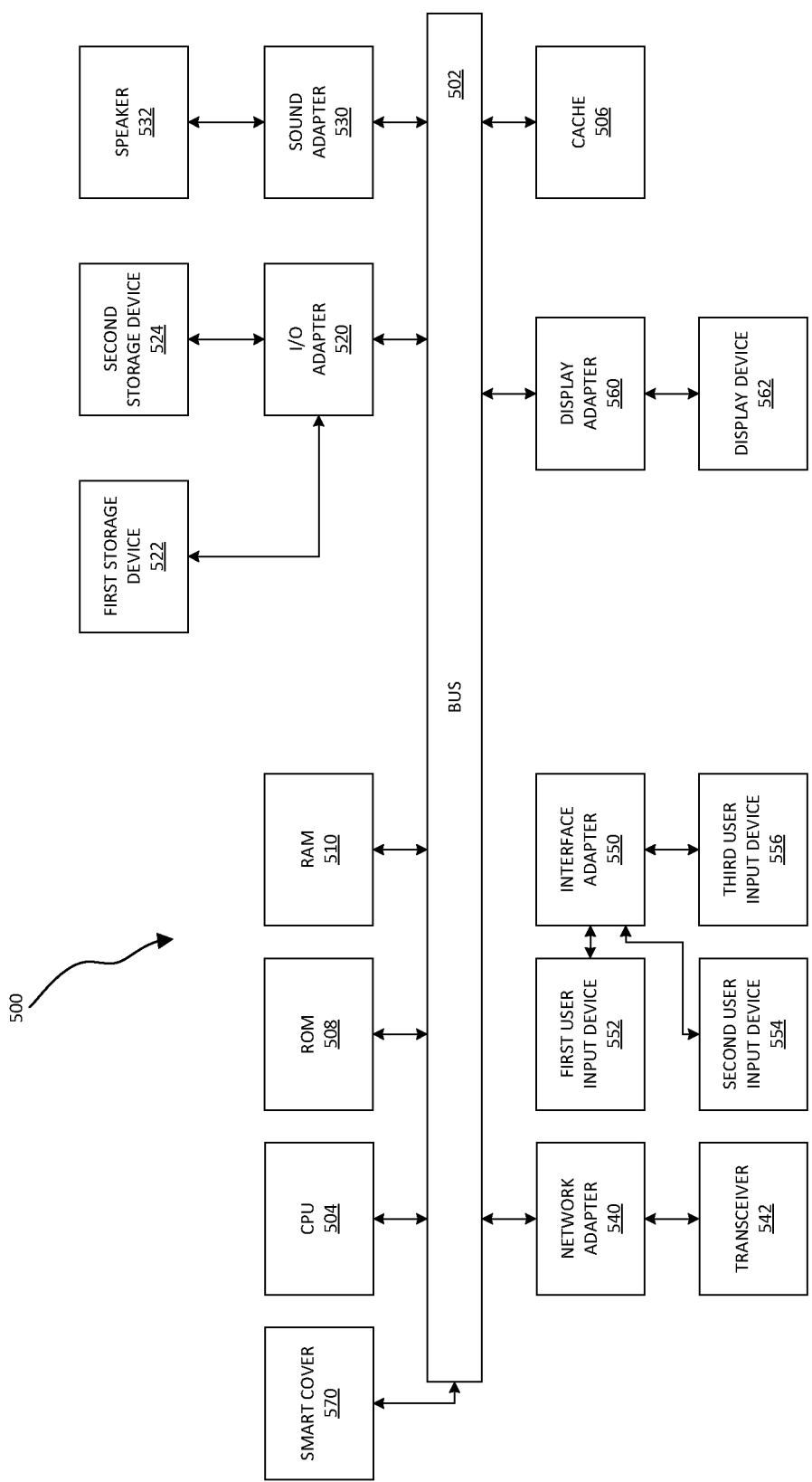
FIG. 5 depicts a block diagram of a processing system, according to embodiments.

Referring now to FIG. 5, an exemplary processing system 500 to which the present embodiments may be applied is shown in accordance with one embodiment. The processing system 500 includes at least one processor (CPU) 504 operatively coupled to other components via a system bus 502. A cache 506, a Read Only Memory (ROM) 508, a Random-Access Memory (RAM) 510, an input/output (I/O) adapter 520, a sound adapter 530, a network adapter 540, a user interface adapter 550, and a display adapter 560, are operatively coupled to the system bus 502.

A first storage device 522 and a second storage device 524 are operatively coupled to system bus 502 by the I/O adapter 520. The storage devices 522 and 524 may be any of a disk storage device (e.g., a magnetic or optical disk storage device), a solid-state magnetic device, and so forth. The storage devices 522 and 524 may be the same type of storage device or different types of storage devices.

A speaker 532 is operatively coupled to system bus 502 by the sound adapter 530. A transceiver 542 is operatively coupled to system bus 502 by network adapter 540. A display device 562 is operatively coupled to system bus 502 by display adapter 560.

A first user input device 552, a second user input device 554, and a third user input device 556 are operatively coupled to system bus 502 by user interface adapter 550. The user input devices 552, 554, and 556 may be any of a keyboard, a mouse, a keypad, an image capture device, a motion sensing device, a microphone, a device incorporating the functionality of at least two of the preceding devices, or any other suitable types of input devices. The user input devices 552, 554, and 556 may be the same type of user input device or different types of user input devices. The user input devices 552, 554, and 556 are used to input and output information to and from system 500. In certain embodiments, the smart cover component 570 is operatively coupled to system bus 502.

The processing system 500 may also include other elements (not shown), as readily contemplated by one of skill in the art, as well as omit certain elements. For example, various other input devices and/or output devices may be included in processing system 500, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 500 are readily contemplated by one of ordinary skill in the art given the teachings of the present disclosure provided herein.

In certain embodiments, the processing system 500 may perform one or more functions related to the operation of the main electronic device 400 including the smart cover 420. For example, CPU 504 of the processing system 500 may correspond to the CPU 412 of the main electronic device 400 shown in FIG. 4. Thus, the CPU 504 may perform functions of the main electronic device 400 such as determining the position of the segments in conjunction with the segment position determiner 412 and/or controlling the on/off display configuration of the different segments in conjunction with the segment display element controller 412. In certain embodiments, the processing system 504 may be a part of the main electronic device 400.

Figure 6:
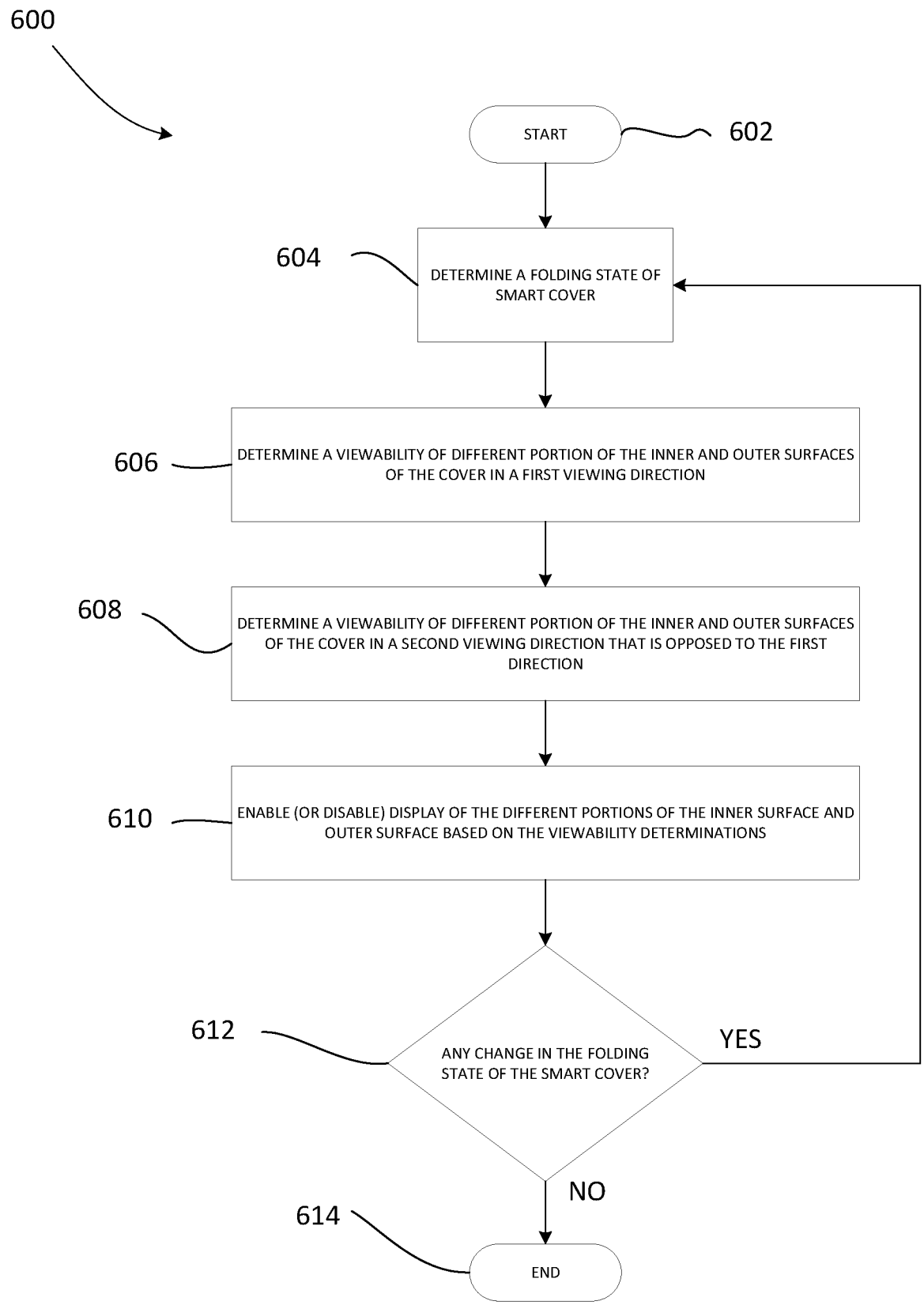
FIG. 6 is a flowchart illustrating a method of controlling the display of a smart cover of an electronic, according to embodiments.

Referring now to FIG. 6, a flowchart is shown of a method 600 of controlling the display of a smart cover for an electronic device, according to certain embodiments. At operation 602, the method begins. At operation 604, the method includes determining a folding state of a smart cover of an electronic device, the smart cover including an electronic cloth-based material on an inner surface of the cover and an outer surface of the cover. At operation 606, the method includes determining a viewability of different portions (or smart cover folding segments) of the inner surface of the cover in a viewing direction of the cover and of different portions of the outer surface of the cover in the viewing direction. At operation 608, the method includes determining a viewability of different portions (or smart cover folding segments) of the inner surface of the cover in an opposed viewing direction that is opposed to the viewing direction and of different portions of the outer surface of the cover in the opposed viewing direction. At operation 610, the method includes enabling (or disabling) the display of different portions of the inner surface and outer surface of the smart cover based on the viewability determinations made in operations 606 and 608. In certain embodiments, if a segment of the smart cover is viewable in the primary viewing direction (or the opposed viewing direction), the method includes causing the display elements associated with the viewable surface of the respective segment to display content. Likewise, if a segment of the smart cover is not viewable in the primary viewing direction (or the opposed viewing direction), the method includes causing the display elements associated with the viewable surface of the respective segment to not display any content (i.e., turn off). At operation 612, the method includes determining (e.g., with one or more sensors incorporated into the smart cover) whether or not there has been any change in the folding state (or folding configuration). If there has not been any change in the folding state (612:NO), the process ends at operation

614. If there has been a change in the folding state (612: YES), the process returns to operation 604 to once again determine the folding state of the smart cover.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions.

In certain embodiments, both sides (i.e., an inside surface and an outside surface) of the smart cover of, for example, a tablet based electronic device includes a layer of e-textile or electronic cloth-based material.

In certain embodiments, the e-textile material is capable of displaying digital content. The content display capability on the e-textile material depends on how the e-textile is designed. In certain embodiments, the e-textile material also has touch sensitivity. Therefore, in these embodiments, the e-textile material can also detect a touch action from a user.

In certain embodiments, the e-textile material is cloth like. For example, in different applications for e-textile materials, the material can be incorporated into a wearable article such as a dress or article of clothing. Therefore, the smart cover of the present embodiments having the e-textile material will have enhanced capabilities by being able to display digital content.

In certain embodiments, in the smart cover, the surface area may have multiple foldable capabilities horizontally (e.g., three or four foldable areas).

In certain embodiments, a single cover display device (e.g., an e-textile) extends across all of the foldable areas of the cover. In this regard, in the example of a four segment cover, a single e-textile covers the entire inside surface or the entire outside surface of the cover. In one example, a flexible OLED display device is used that may bend. In other examples, each surface of each segment of the cover includes a separate display device, which are all operatively connected together and to the main electronic device.

In certain embodiment, the smart cover may have electric connectivity with the display device of the main electronic device.

In certain embodiments, when the smart cover is connected to the main electronic device, then it will be directly connected to the display device thereof, and consuming battery power associated with the main electronic device.

In certain embodiments, when a user folds a portion of the smart cover, then the display areas thereof will be exposed In certain embodiments, when the smart cover is folded, then display device may start to emit the digital content, and with closing of the smart cover, the display device may stop emitting the digital content.

In certain embodiments, the smart cover may recognize each and every fold portion individually, and various sensors can be used for measuring the fold angle in the smart cover.

In certain embodiments, at any point of time, the display device of the main electronic device (e.g., a tablet computer) may communicate with the smart cover, and it may identify how the smart cover is folded along with the shape of the folded smart cover.

In certain embodiments, based on the determined folded condition of the smart cover, the display device of the main electronic device may identify the relative position of the folded smart cover with respect to the display surface of the display device.

In certain embodiments, the display device and smart cover communicate with each other and the relative position and folded condition will be communicated with the display device.

In certain embodiments, if the smart cover is totally covering the display surface (e.g., not folded), then only the outer surface of the smart cover may display content.

In certain embodiments, when the smart cover is covering the display device of the main electronic device, and any confidential message is to be shown, then the display device may communicate with the upper surface of the smart cover, and only summary information or notifications will be shown to the user.

In certain embodiments, based on the folding pattern of the smart cover, the display device and smart cover may identify which portion of the display surface is visible to the user, and which portion of the smart cover is visible to the user.

In certain embodiments, the system may the folding pattern of the smart cover and accordingly calculate a 3D model of the smart cover, and the angular orientation of same.

The descriptions of the various embodiments have been presented for purposes of illustration and are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. An electronic device comprising:
a main display device; and
a cover operatively coupled to the main display device, the cover comprising an inner surface and an outer surface, the inner surface and the outer surface of the cover including an electronic cloth-based material; and
at least one sensor,
wherein the cover includes a plurality of segments that are foldable, at least a first segment of the plurality of segments includes the cloth-based material on the inner surface thereof, and at least a second segment of the plurality of segments includes the cloth-based material on the outer surface thereof, the at least one sensor configured to determine a folding state of each of the plurality of segments,
wherein the electronic cloth-based material comprises a fabric having an electronic display functionality,
wherein viewability of the plurality of segments to a first viewer having a first viewing perspective relative to the display device and to a second opposed viewer having a second viewing perspective that is opposed to the first viewing perspective are determined based on the folding state, and
wherein upon a determination that either the inner surface or the outer surface of any of the plurality of the segments of the cover are not viewable by either the first viewer or the opposed second viewer based on the folding state, content is not displayed on the respective inner and outer surfaces.

2. The electronic device of claim 1, wherein the at least one sensor is configured to determine angles of each segment of the plurality of segments relative to a display area of the display device.

3. The electronic device of claim 1, wherein when the cover is in an at least partially folded state such that at least part of the inner surface of the cover is visible to a viewer in a viewing direction of the display device, the visible inner surface of the cover is configured to display content to the viewer of the display device.

4. The electronic device of claim 1, wherein when the cover is in an at least partially folded state such that at least part of the inner surface of the cover is visible to a viewer that is opposed to a viewing direction of the display device, the visible inner surface of the cover is configured to display content to the viewer that is opposed to the viewing direction of the display device.

5. The electronic device of claim 1, where different areas of the cover are configured to display content depending on a determined folding pattern of the cover.

6. The electronic device of claim 1, where different areas of the cover are configured to not display content depending on a determined folding pattern of the cover.

7. The electronic device of claim 1, wherein when the cover is partially opened, an aggregate display area is determined that includes a display area of the display device and a display area of the electronic cloth-based material that is viewable by a viewer of the display device, and display content is determined based on the aggregate display area.

8. The electronic device of claim 1,
wherein in a non-folded state of the cover, the outer surface of the cover displays summary information content on the electronic cloth-based material, and
wherein in an at least partially folded state of the cover, detailed information related to the summary information is displayed on a folded portion of the electronic cloth-based material and on a display area of the display device.

9. The electronic device of claim 8, wherein the summary information displayed on the outer surface of the cover is based on a confidentiality level of the detailed information.

10. The electronic device of claim 1, wherein the cover includes at least four foldable segments.

11. A method of displaying content, the method comprising:
determining a folding state of a cover of an electronic device, the cover including an electronic cloth-based material on an inner surface of the cover and an outer surface of the cover;
determining a viewability of different portions of the inner surface of the cover in a viewing direction of the cover and of different portions of the outer surface of the cover in the viewing direction;
determining a viewability of different portions of the inner surface of the cover in an opposed viewing direction that is opposed to the viewing direction and of different portions of the outer surface of the cover in the opposed viewing direction;
determining a folding state of each segment of a plurality of segments of the cover using at least one sensor; and
enabling display of the different portions of the inner surface and the outer surface based on the viewability determinations,
wherein at least a first segment of the plurality of segments includes the cloth-based material on the inner surface thereof, and at least a second segment of the plurality of segments includes the cloth-based material on the outer surface thereof,
wherein the electronic cloth-based material comprises a fabric having an electronic display functionality,
wherein viewability of the plurality of segments to a first viewer having a first viewing perspective relative to the display device and to a second opposed viewer having a second viewing perspective that is opposed to the first viewing perspective are determined based on the folding state, and
wherein upon a determination that either the inner surface or the outer surface of any of the plurality of the segments of the cover are not viewable by either the first viewer or the opposed second viewer based on the folding state, content is not displayed on the respective inner and outer surfaces.

12. The method of claim 11, further comprising:
enabling simultaneous display of
a display device of the electronic device based on a determination that the cover is in at least partially folded state, and
at least one portion of the inner surface and the outer surface of the cover based on the viewability determination.

13. The method of claim 11, where different areas of the cover are configured to display content depending on a determined folding pattern of the cover.

14. The method of claim 11, where different areas of the cover are configured to not display content depending on a determined folding pattern of the cover.

* * * * *